(12) United States Patent
Abe

(10) Patent No.: US 9,030,497 B2
(45) Date of Patent: May 12, 2015

(54) DISPLAY DEVICE AND ARRANGEMENT METHOD OF OSD SWITCHES

(75) Inventor: Masatoshi Abe, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 925 days.

(21) Appl. No.: 12/448,522

(22) PCT Filed: Dec. 27, 2006

(86) PCT No.: PCT/JP2006/326089
§ 371 (c)(1),
(2), (4) Date: Jun. 24, 2009

(87) PCT Pub. No.: WO2008/081510
PCT Pub. Date: Jul. 10, 2008

(65) Prior Publication Data
US 2012/0001942 A1    Jan. 5, 2012

(51) Int. Cl.
*G09G 5/00* (2006.01)
*G06F 1/16* (2006.01)

(52) U.S. Cl.
CPC ............. *G09G 5/003* (2013.01); *G06F 1/1671* (2013.01); *G09G 2320/08* (2013.01); *G09G 2340/0492* (2013.01); *G09G 2340/12* (2013.01)

(58) Field of Classification Search
CPC ............. G09G 5/003; G09G 2320/08; G09G 2340/492; H04M 1/7258; G06F 2200/1614
USPC ......................................................... 345/184
See application file for complete search history.

(56) References Cited

U.S. PATENT DOCUMENTS

| | | | | |
|---|---|---|---|---|
| 4,968,257 A | * | 11/1990 | Yalen | 434/308 |
| 6,081,342 A | * | 6/2000 | Nakai et al. | 358/1.16 |
| 6,281,895 B1 | | 8/2001 | Jeong | |
| 6,297,795 B1 | * | 10/2001 | Kato et al. | 345/684 |
| 7,046,233 B2 | * | 5/2006 | Yano et al. | 345/160 |
| 7,411,579 B2 | | 8/2008 | Tsuji et al. | |
| 2002/0158812 A1 | * | 10/2002 | Pallakoff | 345/5 |
| 2003/0098847 A1 | | 5/2003 | Yamamoto | |
| 2004/0012572 A1 | * | 1/2004 | Sowden et al. | 345/173 |

(Continued)

FOREIGN PATENT DOCUMENTS

| | | |
|---|---|---|
| EP | 1 071 282 A2 | 1/2001 |
| JP | 7-334135 | 12/1995 |

(Continued)

OTHER PUBLICATIONS

Japanese Office Action dated Jul. 26, 2011, with English translation.

(Continued)

*Primary Examiner* — Dorothy Harris
(74) *Attorney, Agent, or Firm* — McGinn IP Law Group, PLLC

(57) ABSTRACT

A display device in the invention comprises an OSP section and OSD switches 10 configured to include a plurality of switches for performing various kinds of setting operations using the OSD section. In OSD switches 10, switches 10*a* and 10*b* are disposed on a right side of a front bezel 2 and switches 10*c* and 10*d* are disposed on a lower side of the front bezel 2. By that, the OSD switches can be disposed so that a switch operation can be visually performed without an uncomfortable feeling, without increasing the thickness of a front bezel even if the front bezel is narrow.

12 Claims, 13 Drawing Sheets

KEY CONVERSION PROCESSING TABLE

| | SWITCH (10a) | SWITCH (10b) | SWITCH (10c) | SWITCH (10d) | SWITCH (10e) | SWITCH (10f) |
|---|---|---|---|---|---|---|
| STATE OF BEING NOT ROTATED | UP | DOWN | RIGHT | LEFT | RESET | EXIT |
| ROTATED STATE | RIGHT | LEFT | DOWN | UP | EXIT | RESET |

(56) References Cited

U.S. PATENT DOCUMENTS

| | | | |
|---|---|---|---|
| 2004/0211282 A1* | 10/2004 | Kim | 74/473.3 |
| 2004/0235569 A1* | 11/2004 | Yokoi et al. | 463/43 |
| 2006/0007169 A1* | 1/2006 | Robbins et al. | 345/173 |
| 2006/0158426 A1* | 7/2006 | Hagiwara | 345/156 |
| 2006/0238517 A1* | 10/2006 | King et al. | 345/173 |
| 2006/0265718 A1* | 11/2006 | Tsang et al. | 719/321 |
| 2007/0093281 A1* | 4/2007 | Park et al. | 455/575.4 |

FOREIGN PATENT DOCUMENTS

| | | |
|---|---|---|
| JP | 9-281942 | 10/1997 |
| JP | 11-126054 | 5/1999 |
| JP | 2000-56754 | 2/2000 |
| JP | 2001/34253 | 2/2001 |
| JP | 2002-268617 A | 9/2002 |
| JP | 2003-158692 | 5/2003 |
| JP | 2003-162277 A | 6/2003 |
| JP | 2003-330442 A | 11/2003 |
| JP | 2004-199555 A | 7/2004 |
| JP | 2004-297227 | 10/2004 |
| JP | 2005-92702 A | 4/2005 |
| JP | 2005-267446 | 9/2005 |
| JP | 2006-195768 | 7/2006 |

OTHER PUBLICATIONS

Japanese Office Action dated Jun. 26, 2012 with Partial English Translation.

* cited by examiner

KEY CONVERSION PROCESSING TABLE

|  | SWITCH (10a) | SWITCH (10b) | SWITCH (10c) | SWITCH (10d) |
|---|---|---|---|---|
| STATE OF BEING NOT ROTATED | UP | DOWN | RIGHT | LEFT |
| ROTATED STATE | RIGHT | LEFT | DOWN | UP |
|  |  |  |  |  |

KEY CONVERSION PROCESSING TABLE

|  | SWITCH (10a) | SWITCH (10b) | SWITCH (10c) | SWITCH (10d) | SWITCH (10e) | SWITCH (10f) |
|---|---|---|---|---|---|---|
| STATE OF BEING NOT ROTATED | UP | DOWN | RIGHT | LEFT | RESET | EXIT |
| ROTATED STATE | RIGHT | LEFT | DOWN | UP | EXIT | RESET |
|  |  |  |  |  |  |  |

DISPLAY DEVICE AND ARRANGEMENT METHOD OF OSD SWITCHES

TECHNICAL FIELD

The present invention relates to a display device having an OSD (On-Screen Display) section and an OSD switch for performing an OSD setting operation and an arrangement method of OSD switches.

BACKGROUND ART

FIG. 13 is a view illustrating an example of the configuration of a known display device. FIGS. 13A, 13B, and 13C show display devices each having an OSD (On Screen Display) section. Moreover, in the respective display devices, OSD switches 13a, 13b, and 13c for performing various kinds of setting by the OSD section are disposed on front bezels (frames). In addition, various kinds of OSD settings of the display devices are performed by using the OSD switches 13a, 13b, and 13c by a menu (also called an on-screen menu) on a display.

In addition, the OSD is a section of a display device configured such that various set values and the like of the display device can be set while displaying an on-screen menu on a part of a display screen, and is a section of making it possible to adjust the brightness, contrast, screen size, and the like of the display screen while checking them on the display screen. In addition, in this specification, the 'OSD switch' is also simply called a 'switch'.

In FIG. 13, in known display devices, there is a display device in which four keys (switches) are arrayed in a crosswise direction as shown by the switch 13a and setting of the display device is changed by moving a cursor in various directions on the on-screen menu so that a user can perform an operation intuitively.

Moreover, in recent years, space can be saved by making the front bezel (frame) of the display device small. However, since space where OSD switches are arrayed in a crosswise direction disappears due to narrowing the front bezel in order to make the frame narrow, it has became impossible to adopt the crosswise arrangement. For this reason, there was no choice but to make an arrangement horizontally in a row like the switch 13b while allowing a crosswise operation or to adopt a selection method of an on-screen menu which is not the crosswise operation.

Alternatively, there is also a case where a stick type operation button is adopted as shown by the switch 13c. While this can save space and realize the crosswise operation, the design efficiency is reduced because the thickness direction is increased due to the switch 13c as shown in FIG. 13D.

In addition, there is an OSD input method of a known technique (see Patent Document 1). An object of the OSD input method of the known technique is to provide an OSD input section which rarely operates erroneously and which has good operability and high reliability. For this reason, an operation menu screen for adjusting the brightness, contrast, and the like of a display screen is multi-displayed on the display screen of the display device. A non-contact switch corresponding to an operation menu is provided in a portion close to the operation menu screen of the display screen of, for example, a bottom surface of a bezel of the display device. A control of the display device corresponding to an input operation of the non-contact switch is performed by operating the non-contact switch.

However, the OSD input method of the known technique does not solve the problem of the arrangement of OSD switches caused by the front bezel that became narrow.

[Patent Document 1] Japanese Patent Unexamined Publication No. 2003-158692

DISCLOSURE OF THE INVENTION

Problem to be Solved by the Invention

As described above, in the known display devices shown in FIG. 13, the frame becomes wide if the switch 13a arrayed crosswise is used and the switch cannot be disposed in the crosswise direction if the switch 13b, which is arrayed horizontally in a row on a lower side of the front bezel, is used. Moreover, there was a problem that the thickness direction of the display device was increased when the stick type switch 13c was used.

The present invention has been made to solve such problems, and it is an object of the present invention to provide an arrangement method of OSD switches and a display device in which OSD switches can be disposed without increasing the thickness even if a front bezel is narrow, so that a switch operation can be visually performed without an uncomfortable feeling, and which can improve the operability of the OSD switches.

Means for Solving the Problem

A display device of the present invention is a display device with an OSD section including a plurality of OSD switches for performing various kinds of setting operations using the OSD section, characterized in that the OSD switches are divided into two sides of a front bezel surrounding a display screen. Accordingly, even in the case where the front bezel is narrow and there is no space where switches are arrayed in the crosswise direction on one side, the switches are disposed up, down, left, and right by disposing the switches on two sides simultaneously, so that the switches can be operated with a sense like the crosswise arrangement.

In addition, the display device of the present invention is characterized in that the OSD switches are divided into two adjacent sides of the front bezel.

Accordingly, even in the case where the front bezel is narrow and there is no space where switches are arrayed in the crosswise direction on one side, the switches can be disposed up, down, left, and right by disposing the switches on two sides simultaneously. Accordingly, the switches can be operated with a sense like the crosswise arrangement. Moreover, since an operation of an on-screen menu and an OSD switch can visually correspond to each other, the on-screen menu can be operated intuitively without an uncomfortable feeling. Accordingly, it becomes possible to improve the operability.

In addition, the display device of the present invention is characterized in that the OSD switches are configured with switches for crosswise direction of upper, lower, left, and right directions or configured by the switches for crosswise direction and a desired switch other than for the crosswise direction.

Accordingly, in addition to being able to operate the switches with a sense like the crosswise arrangement by disposing the switches up, down, left, and right, a section which can be operated by the OSD switches can be extended. For example, not only moving a cursor or the like in the upper, lower, left, and right directions on the on-screen menu but also other operations (for example, a RESET operation) can be performed. Therefore, operability can be improved.

In addition, the display device of the present invention is characterized in that the display device is configured to be rotatable in left and right directions within a plane parallel to the display screen by a rotation mechanism.

Accordingly, in the display device configured to be rotatable, even in the case where the front bezel is narrow and there is no space where switches are arrayed in the crosswise direction on one side, the switches can be disposed up, down, left, and right by disposing the switches on two sides simultaneously.

In addition, the display device of the present invention is characterized in that a section exchanging operation functions of the OSD switches disposed on respective sides of the front bezel when the display device has been rotated by the rotation mechanism is included.

Accordingly, when the display device has been rotated, it becomes a visually corresponding switch operation. Therefore, since a setting operation can be performed without an uncomfortable feeling, the operability can be improved.

In addition, the display device of the present invention is characterized in that the OSD switches include each switch for crosswise direction of upper, lower, left, and right directions and a switch other than for the crosswise direction, and a section exchanging operation functions of each switch for the crosswise direction and the switch other than for the crosswise direction when the display screen has been rotated by the rotation mechanism is included.

Accordingly, also when the display device has been rotated, a visually corresponding switch operation can be performed for each switch for the crosswise direction and the switch other than for the crosswise direction. Therefore, since a setting operation can be performed without an uncomfortable feeling, the operability can be improved.

In addition, the display device of the present invention is characterized in that a section displaying a key guide of the OSD switches on the display screen is included.

Accordingly, in the case where the front bezel is narrow and it cannot be performed easily to provide marking or silk on the OSD switch, a section of each switch can be clarified even if neither marking nor silk is provided by writing the switch section within a display device screen near each switch instead of the marking or silk. Therefore, the operability can be improved.

In addition, the display device of the present invention is characterized in that a section is included for changing the contents of the key guide corresponding to operation functions of the OSD switches when the operation functions of the OSD switches change according to the type and set value of an OSD setting operation is included.

Accordingly, when the operation functions of the OSD switches change according to the type of settings and set values during various kinds of setting operations by the OSD, the written contents of the key guide can be changed correspondingly thereto. Therefore, it becomes possible to clearly display the section of the switch operation. Thus, operability can be improved by changing the display of the key guide according to the situation of a setting operation.

In addition, the display device of the present invention is characterized in that a section is included for determining a rotation state of the display device by the rotation mechanism.

Accordingly, since it becomes possible to automatically determine whether or not the display device is rotating, a manual operation is not needed. Therefore, the operation functions of the OSD switches can be automatically exchanged.

In addition, an arrangement method of OSD switches of the present invention is an arrangement method of the OSD switches in a display device having an OSD section and a plurality of OSD switches for performing various kinds of setting operations using the OSD section, characterized in that the OSD switches are disposed to be divided into two sides of a front bezel surrounding a display screen.

Accordingly, even in the case where the front bezel is narrow and there is no space where switches are arrayed in the crosswise direction on one side, the switches can be disposed up, down, left, and right by disposing the switches on two sides simultaneously, so that the switches can be operated with a sense like the crosswise arrangement.

Effect of the Invention

In the display device of the present invention, OSD switches are disposed to be divided into two sides of the front bezel surrounding the display screen. Accordingly, even in the case where the front bezel is narrow and there is no space where switches are arrayed in the crosswise direction on one side, the switches can be disposed up, down, left, and right by disposing the switches on two sides simultaneously, so that the switches can be operated with a sense like the crosswise arrangement.

REFERENCE SYMBOLS

Figure 1:
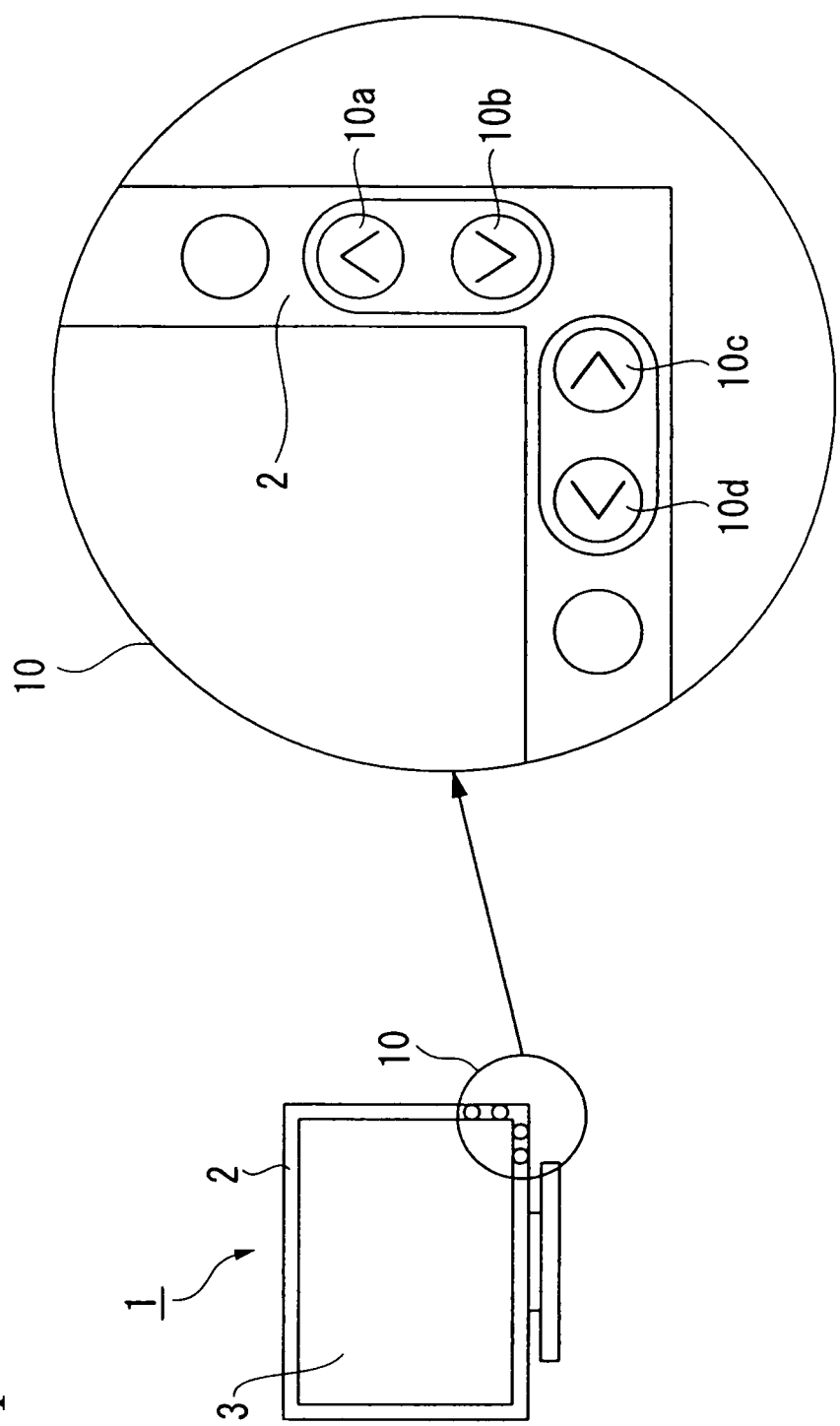
FIG. 1 is a view illustrating a first embodiment of a display device of the present invention.

1: display device
2: front bezel
3: display screen
5: BRIGHTNESS and CONTRAST adjustment bar
6: horizontally long menu
7: stand
10: OSD switch
10a, 10b, 10c, 10d: switch
11: rotation determination switch
13a, 13b, 13c: switch
101: image processing unit
102: image MIX unit
103: image display unit
104: operation signal processing unit
105: OSD control unit
110: operation signal converting unit

BEST MODE FOR CARRYING OUT THE INVENTION

Next, best modes for carrying out the present invention will be described with reference to the drawings.

First Embodiment

FIG. 1 is a view illustrating a first embodiment of a display device of the present invention and shows an example of the arrangement of an OSD switch 10 in a display device 1. In FIG. 1, the OSD switch 10 arrayed in an L shape is provided in a surrounding front bezel (frame) 2 of a display screen 3 of the display device 1. In the OSD switch 10 shown in FIG. 1, a switch 10a is assigned to an upward direction key (upward direction switch), a switch 10b is assigned to a downward direction key (downward direction switch), a switch 10c is assigned to a right direction key (right direction switch), and a switch 10d is assigned to a left direction key (left direction switch). On the right side of the front bezel 2, the switch 10a is disposed above the switch 10b. On the lower side of the front bezel 2, the switch 10d is disposed on the left side of the switch 10c. In addition, in this specification, the 'OSD switch' may be simply called a 'switch'.

Figure 2:
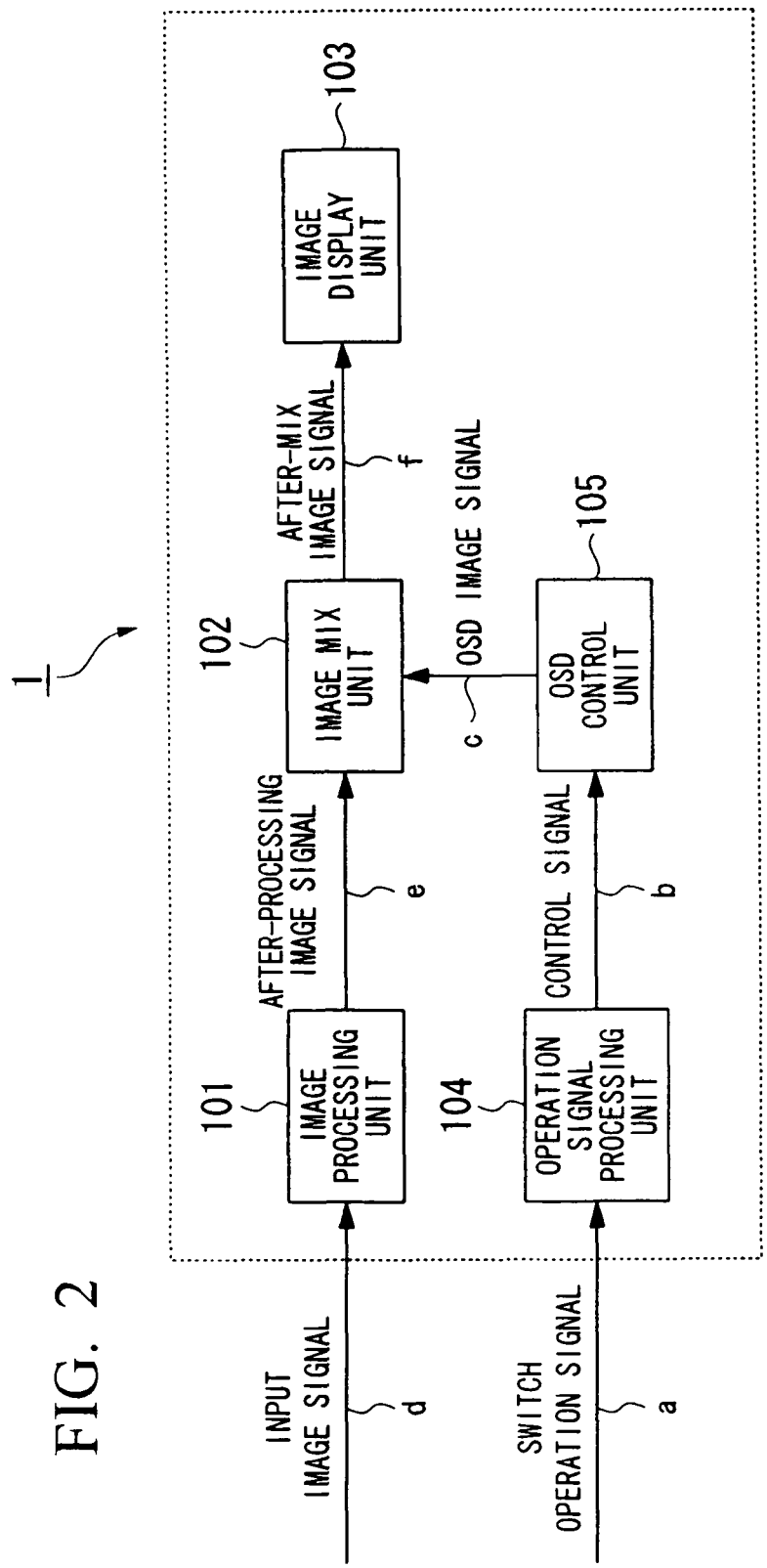
FIG. 2 is a block diagram illustrating an example of the circuit configuration of the display device in the first embodiment.

In addition, FIG. 2 is a block diagram illustrating an example of the circuit configuration of the display device in the first embodiment and shows sections directly related to the present invention. The display device 1 shown in FIG. 2 is configured to include an image processing unit 101, an image MIX unit 102, an image display unit 103, an operation signal processing unit 104, and an OSD control unit 105.

In FIG. 2, the operation signal processing unit 104 detects a switch operation signal a, which is obtained by pressing any switch of the OSD switch 10 shown in FIG. 1 and outputs a control signal b corresponding to the switch operation to the OSD control unit 105. The OSD control unit 105 generates an OSD image signal c corresponding to the pressed switch and outputs it to the image MIX unit 102. The image processing unit 101 generates an after-processing image signal e by image processing an input image signal d and outputs it to the image MIX unit 102. The image MIX unit 102 generates an after-MIX image signal f by mixing the after-processing image signal e processed in the image processing unit 101 with the OSD image signal c and outputs it to the image display unit 103. The image display unit 103 receives the after-MIX image signal f and displays an image.

Figure 3:
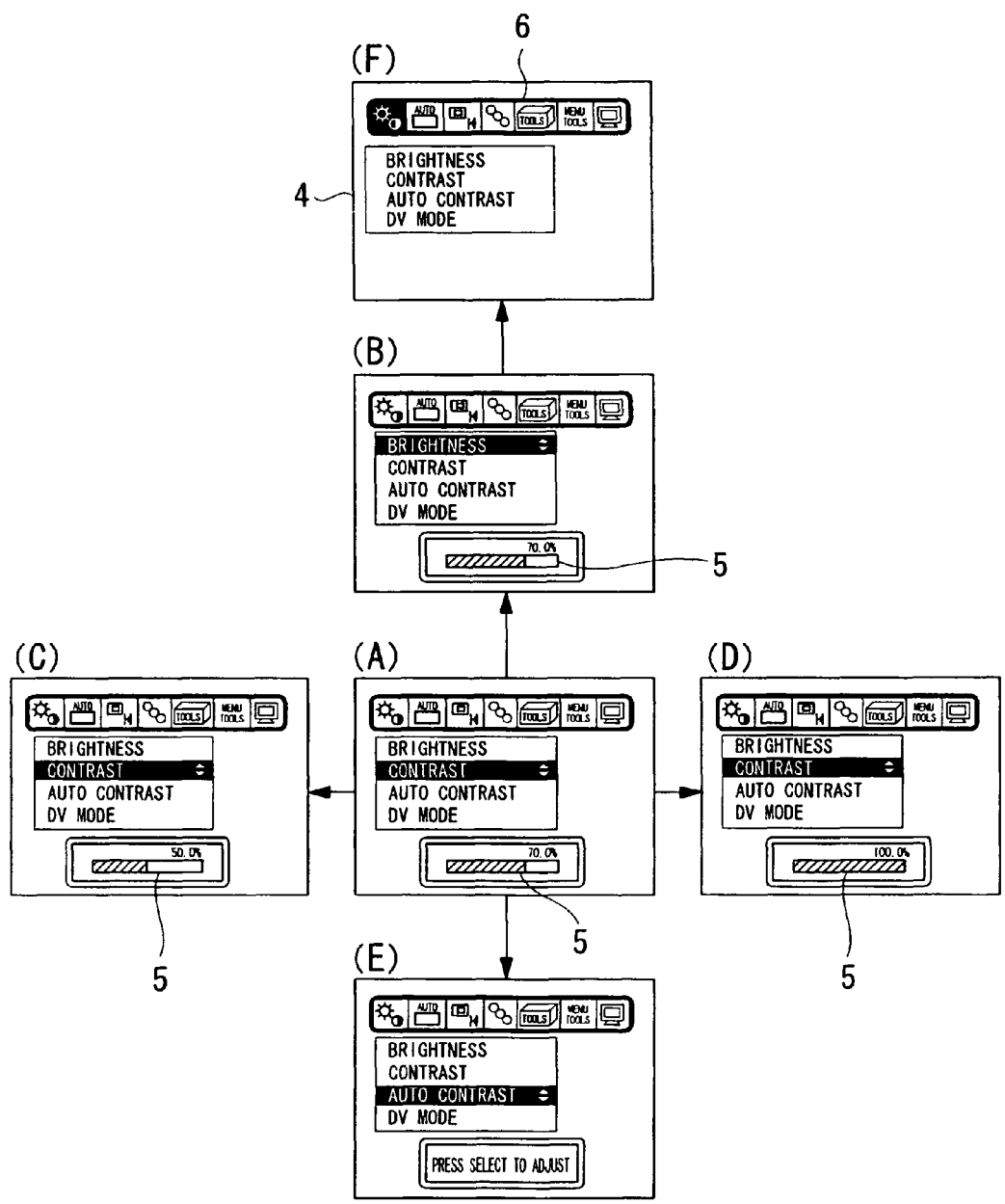
FIG. 3 is a view illustrating an example of an OSD screen.

For example, as shown in FIG. 3A, when moving a cursor downward from 'CONTRAST' to 'AUTO CONTRAST' in a menu while the on-screen menu is being displayed on an OSD screen 4, the switch 10b shown in FIG. 1 is pressed. The switch operation signal a indicating that the switch 10b has been pressed is detected in the operation signal processing unit 104 and the control signal b is output to control the OSD control unit 105. The OSD image signal c which is a signal of the on-screen menu generated by the OSD control unit 105 is transmitted to the image MIX unit 102.

The after-processing image signal e obtained by processing the input image signal d by the image processing unit 101 and the OSD image signal c output from the OSD control unit 105 are combined in the image MIX unit 102 and are projected onto the screen in the image display unit 103. Thus, display on which the cursor has moved to the one-lower side can be performed as shown in FIG. 3E.

Moreover, when desiring to reduce the percentage (%) value of a CONTRAST bar 5 from the position of FIG. 3A, OSD display on which the percentage (%) value of the CONTRAST bar 5 has decreased from 70% to 50% as shown in FIG. 3C is obtained by pressing the left direction switch 10d shown in FIG. 1.

In addition, when desiring to increase the percentage (%) value of the CONTRAST bar 5 from the position of FIG. 3A, OSD display on which the CONTRAST bar 5 has increased from 70% to 100% as shown in FIG. 3D is obtained by pressing the right direction switch 10c shown in FIG. 1.

In addition, when desiring to move a cursor upward from the position of FIG. 3A, OSD display on which the cursor has moved upward as shown in FIG. 3B is obtained by pressing the upward direction switch 10a shown in FIG. 1.

Thus, according to the first embodiment of the present invention, even in the case where there is no space where switches are arrayed in the crosswise direction on one side of a narrow front bezel (frame), it becomes possible to dispose the switches on the upper, lower, left, and right sides by disposing the switches on two sides simultaneously. Accordingly, an operation of the on-screen menu and the OSD switch can be made to visually correspond to each other. For this reason, since the on-screen menu can be operated intuitively without an uncomfortable feeling, it becomes possible to improve the operability.

Moreover, in the example shown in FIG. 1, the example in which the section of the OSD switch 10 is displayed by the upper, lower, left, and right arrows is shown. However, the same effects are also obtained in writing words, such as UP/DOWN/LEFT/RIGHT or writing other symbols indicating the same meaning.

Second Embodiment

Figure 4:
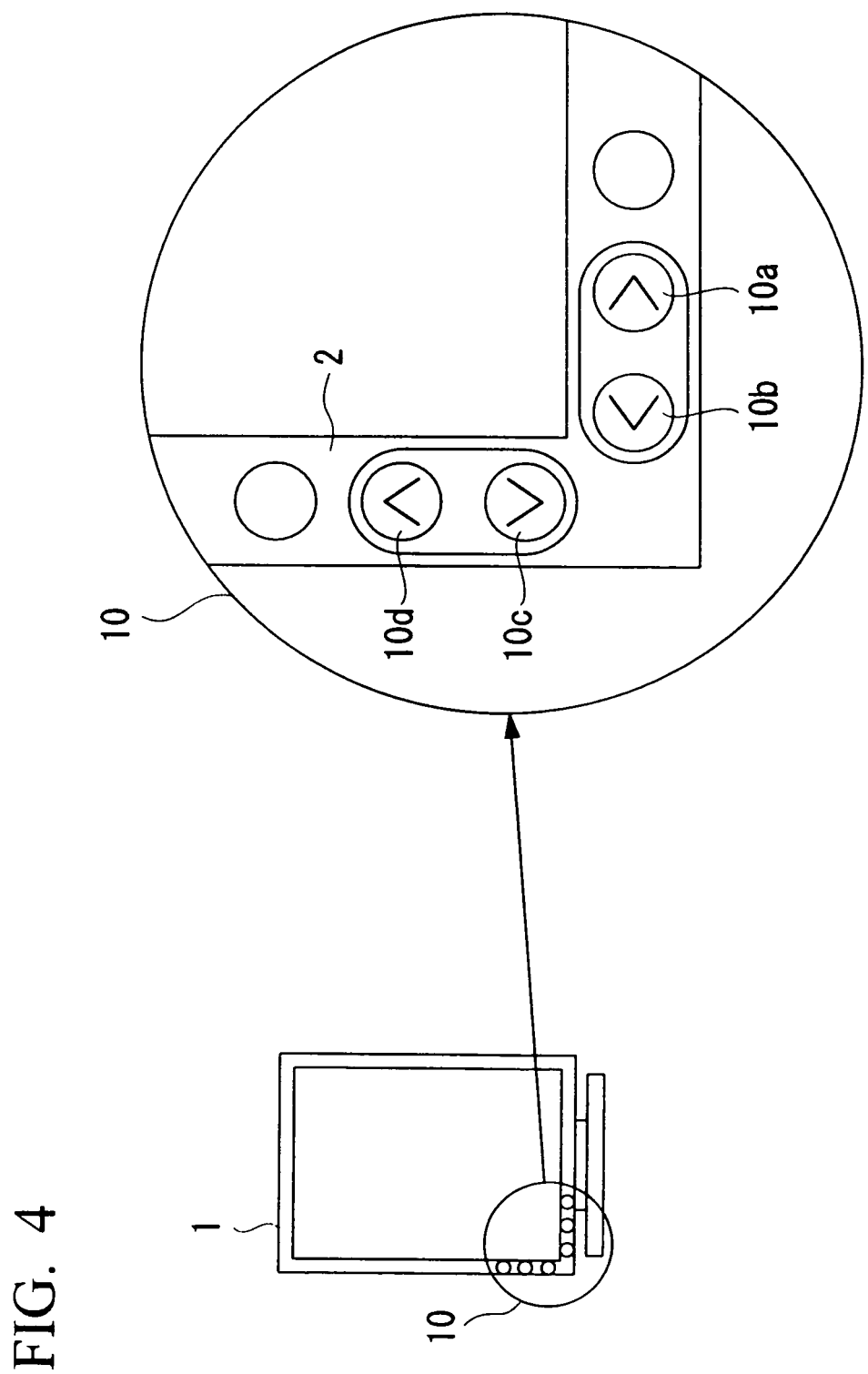
FIG. 4 is a view illustrating a second embodiment of the display device of the present invention.

Next, a second embodiment of the present invention will be described. FIG. 4 is a view illustrating the second embodiment of the display device of the present invention. An example shown in FIG. 4 shows a state where the display device 1 shown in FIG. 1 has rotated 90° to the right. Moreover, FIG. 5 is a block diagram showing an example of the circuit configuration of the display device in the second embodiment.

Switches 10a, 10b, 10c, and 10d shown in FIG. 4 are switches which are physically the same as the switches 10a, 10b, 10c, and 10d shown in FIG. 1.

Figure 5:
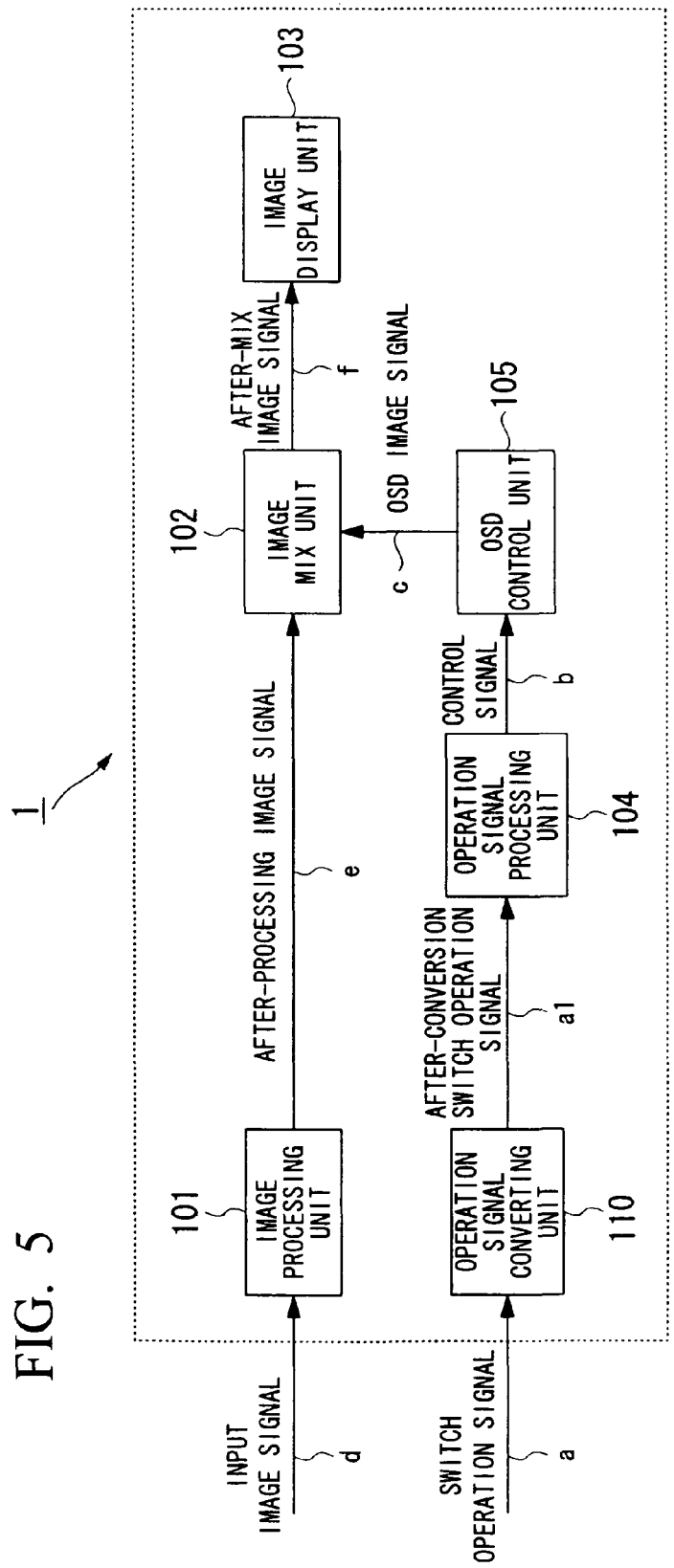
FIG. 5 is a block diagram illustrating an example of the circuit configuration of the display device in the second embodiment.

As shown in FIG. 5, an operation signal converting unit 110 converts the switch operation signal a according to rotation of the display device 1 and generates an after-conversion switch operation signal a1. The other sections are the same as those of FIG. 2 and the explanation will be omitted.

Figures 6A, 6B, 6C:
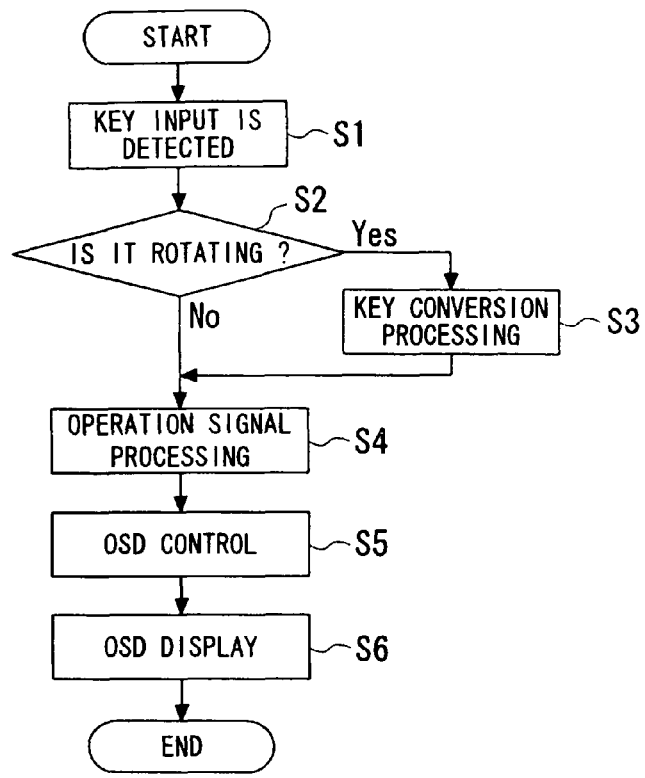
FIG. 6A is a flow chart illustrating the flow of processing in the display device in the embodiment of the present invention.
FIG. 6B is a chart illustrating a key conversion processing table used in the embodiment of the present invention.
FIG. 6C is a chart illustrating another example of a key conversion processing table used in the embodiment of the present invention.

FIG. 6A is a flow chart illustrating the flow of processing in the display device 1, and FIG. 6B shows a key conversion processing table used when converting the switch operation signal a according to rotation of the display device 1.

Next, an operation in the above configuration example will be described. When desiring to move a cursor downward in the on-screen menu shown in FIG. 3A, it is necessary to press the switch 10b of FIG. 4 in an unchanged state (state where the display device 1 has rotated only 90° to the right; however a state where a screen itself displayed is not rotated but is displayed). Moreover, the switch 10c needs to be pressed when desiring to increase the percentage (%) value of the CONTRAST bar 5, and the switch 10d needs to be pressed when desiring to decrease the percentage (%) value of the bar. In any case, since it is different from the visually corresponding switch, an uncomfortable feeling occurs. Therefore, when the attaching direction of the switch 10 has rotated 90°, an operation of each switch is changed.

The switch 10c originally corresponds to the right direction switch. Accordingly, when the switch 10c is pressed as it is, it becomes a rightward operation, that is, a motion which increases the CONTRAST bar 5. On the other hand, the rightward operation is converted to a downward operation by the operation signal converting unit 110. After the after-conversion switch operation signal a1 which was converted is output to the operation signal processing unit 104, the cursor moves downward as described in the first embodiment and it becomes an OSD screen shown in FIG. 3E.

Similarly, when the switch 10a is pressed, a right direction switch signal is output as the after-conversion switch operation signal a1 and it becomes an OSD screen shown in FIG. 3D. In addition, when the switch 10b is pressed, a signal of a left direction switch is output as the after-conversion switch operation signal a1 and it becomes an OSD screen shown in FIG. 3C. When the switch 10d is pressed, a signal of an upward direction switch is output as the after-conversion switch operation signal a1 and it becomes an OSD screen shown in FIG. 3B. Accordingly, since it becomes a visually corresponding operation, it is possible to perform an operation without an uncomfortable feeling.

Next, the flow of an operation will be described with reference to the flow chart shown in FIG. 6. First, it is detected whether or not the switch 10 shown in FIG. 4 has been pressed (step S1). Then, it is checked whether or not the switch 10 is currently in a rotated state (a state where the switch 10 has been rotated 90° to the right compared with FIG. 1) (step S2).

When it is determined that the switch 10 is in the rotated state in step S2, key conversion processing is performed (step S3). For the conversion processing, as shown in the conversion processing table of FIG. 6B, when the switch 10a is pressed, it is an upward operation if it is not in the rotated state but it becomes a rightward operation if it is in the rotated state. Similarly, a downward operation is converted to a leftward operation when the switch 10b is pressed, a rightward operation is converted to a downward operation when the switch 10c is pressed, and a leftward operation is converted to an upward operation when the switch 10d is pressed.

In the operation signal processing shown in step S4, processing corresponding to a key operation is performed and an OSD control corresponding to the key operation is performed (step S5), and OSD display is performed (step S6).

Thus, according to the second embodiment of the present invention, in a display device in which switches are disposed in an L shape, it becomes a visually corresponding operation by exchanging sections of the switches in rotating the display device. Accordingly, similar to the first embodiment, it becomes possible to perform an operation without an uncomfortable feeling.

It becomes possible to obtain the same effect as in the original crosswise arrangement even if the switches are disposed in an L shape as in the present invention.

Third Embodiment

Next, a third embodiment of the present invention will be described. When operating an OSD switch, there is assignment of a section corresponding to each switch. In order to clarify the section of each switch, a marking or silk is generally provided above or near the switch. However, there is a case where the marking or silk cannot be easily provided as described above due to making a front bezel narrow. In this case, by writing a switch section on the OSD or the like within a display device screen near each switch instead of the marking or silk, it becomes possible to clarify the section of each switch even if neither the marking nor the silk is provided. This example will be described.

Figure 7:
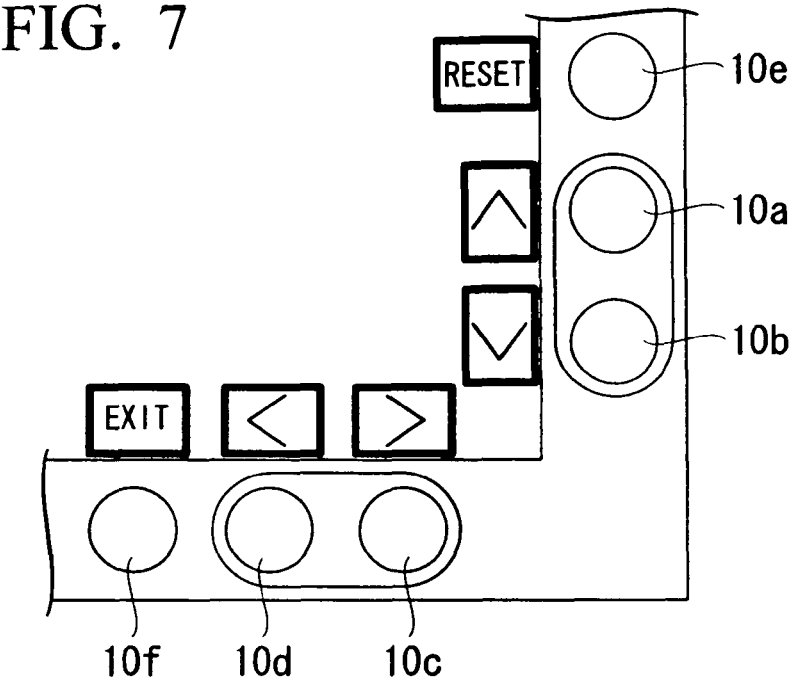
FIG. 7 is a view illustrating a third embodiment of the display device of the present invention.

FIG. 7 is a view illustrating the third embodiment of the display device of the present invention and is a view illustrating the OSD switch 10 of the display device 1 and an example of writing of a switch section by an OSD screen. As shown in FIG. 7, each section assigned to each key becomes clear by writing it on the display screen 3 by the on-screen that the switch 10a is an upward direction switch, the switch 10b is a downward direction switch, the switch 10c is a right direction switch, and the switch 10d is a left direction switch.

Figure 8:
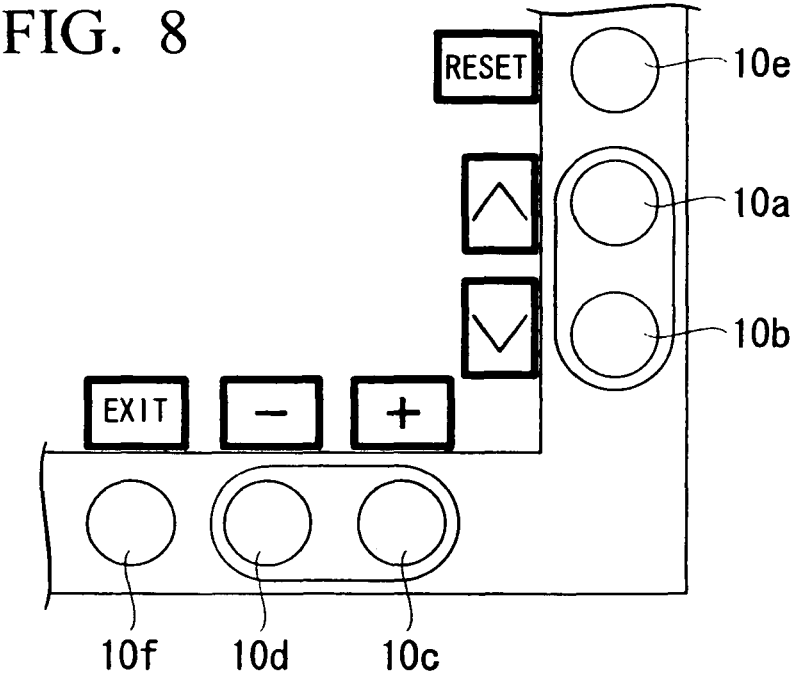
FIG. 8 is a view illustrating a first example of other writing by an on-screen.

FIG. 8 is a view illustrating a first example of other writing by the on-screen. In the example shown in FIG. 8, the switch 10c is written as a + direction key and the switch 10d is written as a – direction key on the on-screen.

Next, an operation in the above configuration example will be described. When a cursor is at the top position as shown in FIG. 3F, the cursor moves left and right (not shown) on a horizontally long menu 6 by pressing the right direction switch 10c and the left direction switch 10d shown in FIG. 7. When the cursor is at the position shown in FIG. 3A, it becomes an operation of increase and decrease of the bar 5.

In this case, at the cursor position shown in FIG. 3F, a right direction key guide is displayed on the switch 10c and a left direction key guide is displayed on the switch 10d as shown in FIG. 7 and it is clarified that the movement of the switches 10c and 10d is a right and left movement of the cursor on the screen of FIG. 3F.

Moreover, at the cursor position of the screen shown in FIG. 3A, a '–' key guide is displayed on the switch 10d and a '+' key guide is displayed on the switch 10c as shown in FIG. 8 and it is clarified that the movement of the switches 10c and 10d is increase and decrease of the CONTRAST bar 5 on the screen of FIG. 3A. Accordingly, it becomes easy for a user to recognize an operation of the on-screen more visually.

Thus, in the third embodiment of the present invention, it becomes possible to clearly display the section of a key operation for the user by changing the written contents of the key guide according to the position of the cursor of the on-screen menu.

Figure 9:
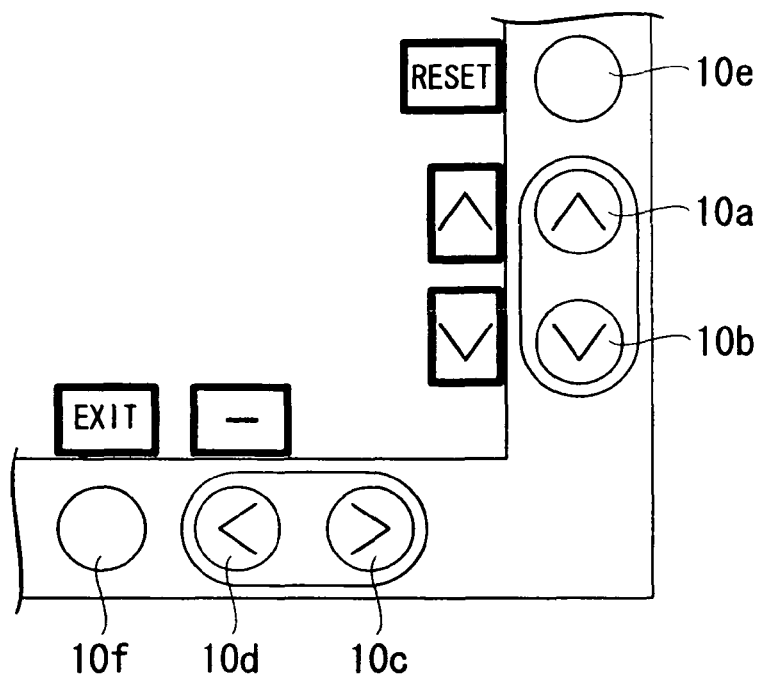
FIG. 9 is a view illustrating a second example of other writing by the on-screen.

Moreover, in the state shown on the screen of FIG. 3D, the display of the CONTRAST bar 5 is MAX (maximum 100%). Accordingly, since the CONTRAST bar 5 cannot be operated in the increasing direction, the rightward '+' key guide on the switch 10c is deleted in order to express that the CONTRAST bar 5 cannot be increased, as shown in FIG. 9. Then, since the user understands which switch is effective at a glance, the right direction switch 10c is not erroneously pressed. This makes it easy to recognize an on-screen operation visually. Moreover, instead of deleting the '+' key guide, it is also possible to change a color, for example, gray, in order to express that it cannot be operated (not shown).

Fourth Embodiment

Next, a fourth embodiment of the present invention will be described.

Figure 10:
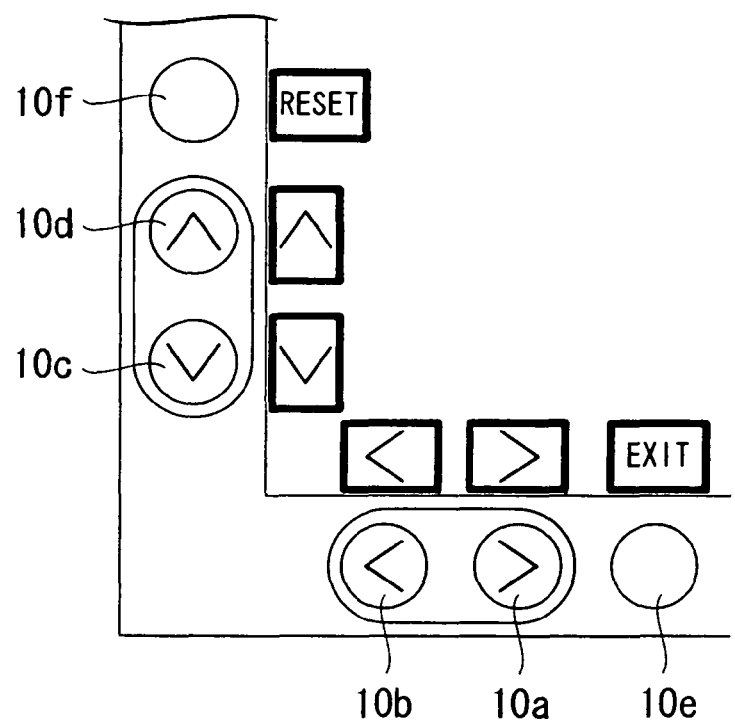
FIG. 10 is a view illustrating a fourth embodiment of the display device of the present invention.

FIG. 10 is a view illustrating the fourth embodiment of the display device of the present invention. The example shown in FIG. 10 is an example in which the display device of the third embodiment shown in FIG. 7 has rotated 90° to the right. Moreover, in the fourth embodiment, a flow chart shown in FIG. 6A shows the flow of an operation and FIG. 6C shows a key conversion processing table.

Switches 10a, 10b, 10c, 10d, 10e, and 10f shown in FIG. 10 are switches which are physically the same as the switches 10a, 10b, 10c, 10d, 10e, and 10f shown in FIG. 7. Moreover, in FIG. 10, the example is an example in which the switch 10e is configured as an EXIT key and the switch 10f is configured as a RESET key. Thus, also in switches other than the switches for upper, lower, left, and right directions, it is possible to exchange assignments of keys when the display device 1 has rotated.

An operation of the configuration example shown in FIG. 10 will be described. For example, the switch 10e shown in FIG. 7 is a switch of RESET and the switch 10f is a switch of EXIT. However, if the sections are the same also when it has rotated 90°, the RESET switch 10e which was above the switches for upward and downward directions comes beside the switches 10a and 10b for left and right directions. In addition, the EXIT switch 10f which was beside the switches for left and right directions comes above the switches 10c and 10d for upward and downward directions.

In this state, since the positional relationship of the switches is different from that before rotation, an uncomfortable feeling occurs. For this reason, when the switch 10e shown in FIG. 10 is pressed, the switch operation signal 'a' is converted to an EXIT signal by the operation signal converting unit 110 shown in FIG. 5. In addition, when the switch 10f shown in FIG. 10 is pressed, the switch operation signal 'a' is converted into a RESET signal by the operation signal converting unit 110. Thus, by exchanging the signals of RESET and EXIT of the switch 10e and the switch 10f, it becomes possible to perform a switch operation without confusion.

Furthermore, in the fourth embodiment, in the flow chart shown in FIG. 6A, key conversion processing in step S3 is performed using the key conversion processing table shown in FIG. 6C. When the switch 10e is pressed, it is a RESET operation if the display device 1 does not rotate 90° to the right, but it is converted into the EXIT operation if it is rotating. In addition, when the switch 10f is pressed, it is the EXIT operation if the display device 1 does not rotate, but it is converted into the RESET operation if it is rotating. Since processing of other switches is the same as that in the second embodiment, the explanation will be omitted.

Moreover, as shown in FIG. 10, if RESET is displayed beside the switch 10f and EXIT is displayed beside the switch 10e on the screen when the switches have rotated 90°, the operation can be correctly performed even if operations of the switches are exchanged.

Moreover, if exchange of switch sections is performed in the display device in which a marking or silk is disposed on a switch or on a front bezel, the marking or the silk incorrectly identities the switch. Exchange of switches can be realized without an uncomfortable feeling by guiding it through a key guide without providing marking or silk on the switch or on the front bezel. In addition, since there is neither a marking nor silk on the switch or on the front bezel, it can be made smart in terms of design.

Fifth Embodiment

Next, a fifth embodiment of the present invention will be described.

For rotation of the OSD switch described above, conventionally, the user set whether to use a rotated OSD menu (menu in which sections of OSD switches have been exchanged) or to use a normal OSD menu (menu in which sections of OSD switches are the same) with the on-screen menu or the like. On the other hand, a method of automatically recognizing whether it is rotated or it is not rotated will be described.

FIGS. 11A-11G are views illustrating the fifth embodiment of the display device of the present invention and is a view illustrating the appearance of the display device. Moreover, FIG. 12 is a block diagram showing an example of the circuit configuration of the display device in the fifth embodiment.

Figure 11A:
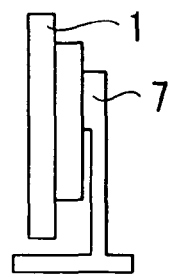
FIG. 11A is a side view illustrating a fifth embodiment of the display device of the present invention.
Figure 11B:
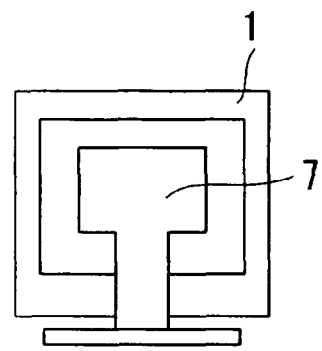
FIG. 11B is a back view illustrating a fifth embodiment of the display device of the present invention.
Figure 11C:
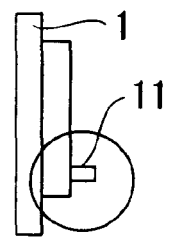
FIG. 11C is a side view illustrating a fifth embodiment of the display device of the present invention.
Figure 11D:
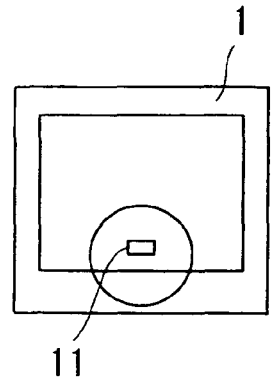
FIG. 11D is a back view illustrating a fifth embodiment of the display device of the present invention.

FIG. 11A is a side view of a stand-attached display device having a stand 7 and FIG. 11B shows a back view of the stand-attached display device. FIG. 11C shows a side view of the display device when the stand 7 is removed. FIG. 11D shows a back view of the display device without a stand when the stand 7 is removed.

Figure 11E:
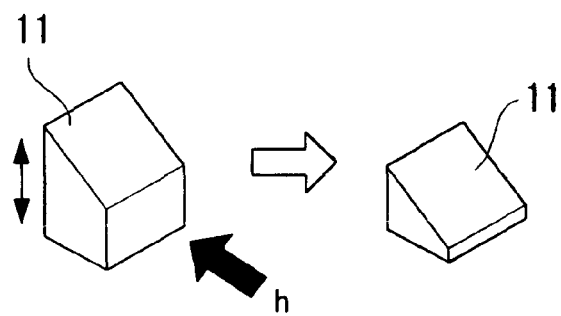
FIG. 11E is a view illustrating a rotation determination switch used in a fifth embodiment of the display device of the present invention.
Figure 11F:
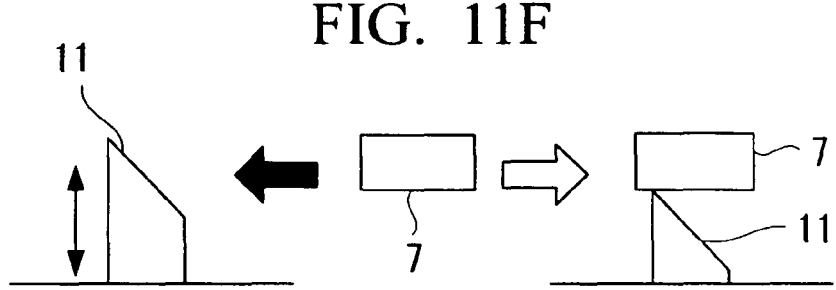
FIG. 11F is a view illustrating a movement of the rotation determination switch used in a fifth embodiment of the display device of the present invention.

Moreover, FIGS. 11E and 11F are views in which a rotation determination switch 11 disposed in a place enclosed with a circle of FIGS. 11C and 11D are enlarged.

Figure 12:
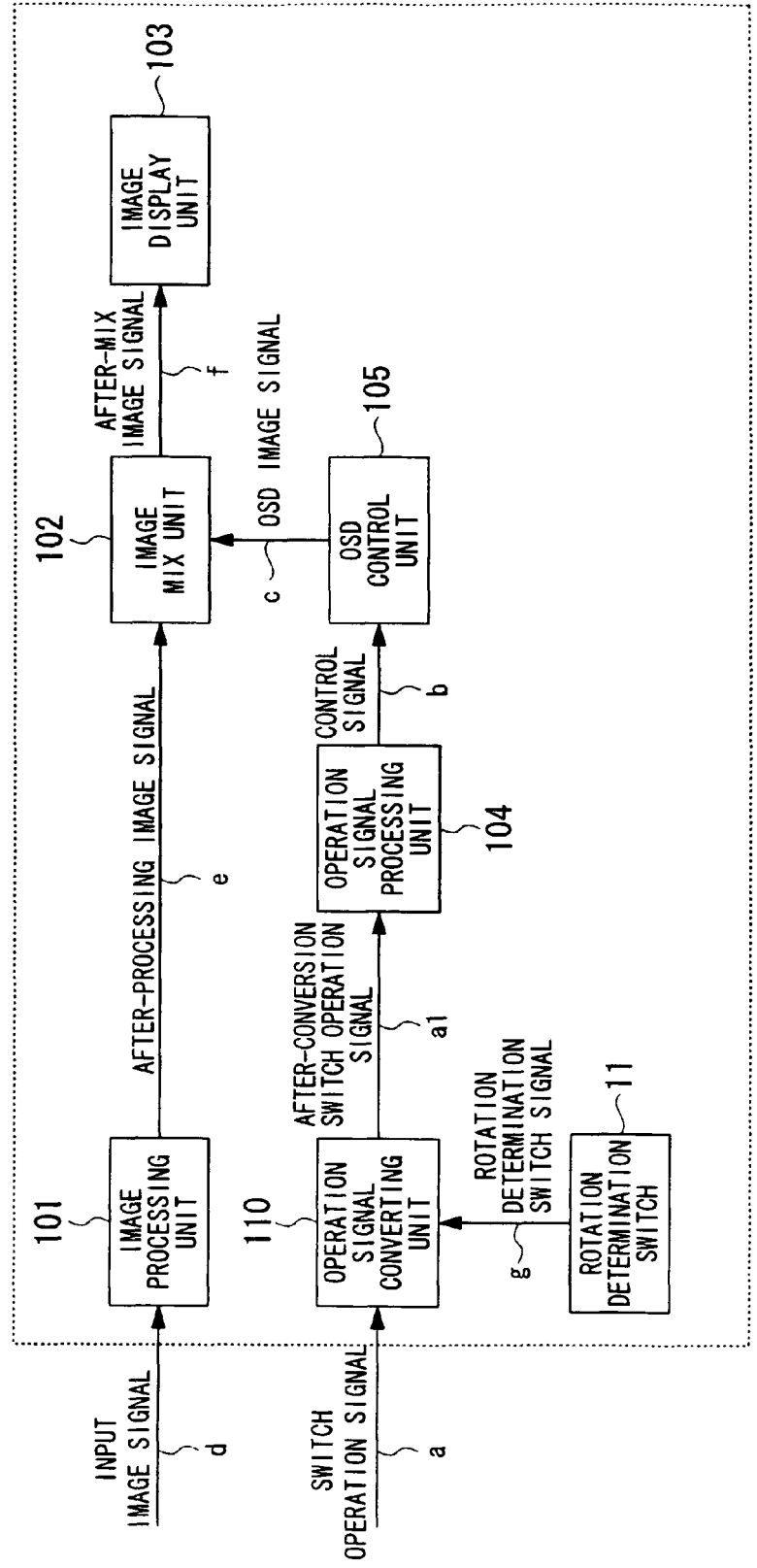
FIG. 12 is a block diagram illustrating an example of the circuit configuration of the display device in the fifth embodiment.
Figure 13A:
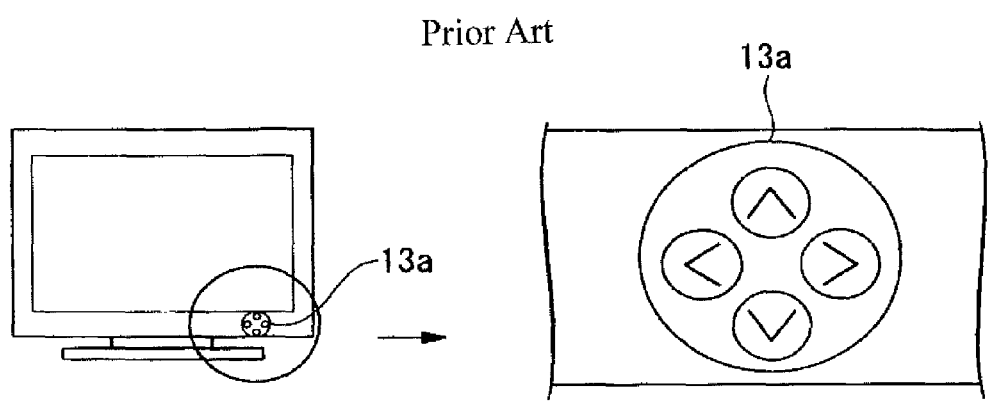
FIG. 13A is a front view illustrating an example of a known display device.
Figure 13B:
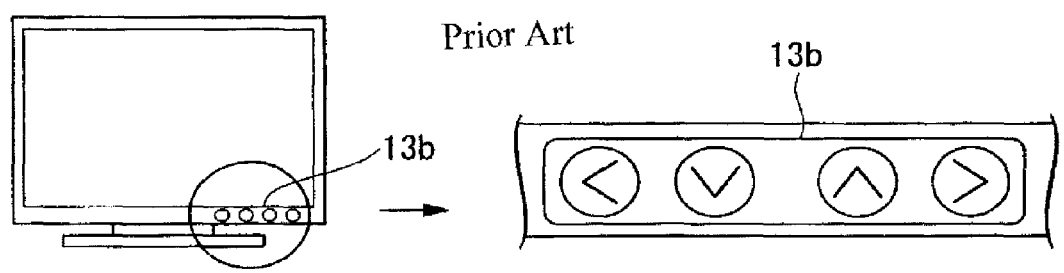
FIG. 13B is a front view illustrating another example of a known display device.
Figure 13C:
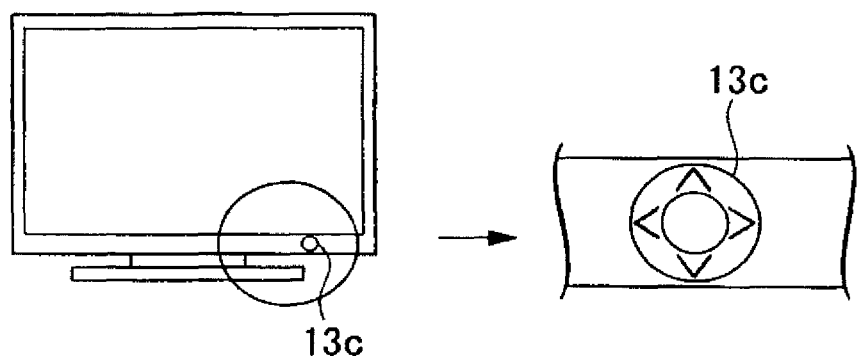
FIG. 13C is a front view illustrating another example of a known display device.
Figure 13D:
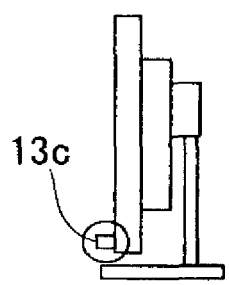
FIG. 13D is a side view illustrating the known display device shown in FIG. 13C.

In FIG. 12, a rotation determination switch 11 for determining rotation of the display device 1 is connected to an operation signal converting unit 110. Moreover, since other sections are the same as those of the circuit block diagram shown in FIG. 5, the explanation will be omitted.

Figure 11G:
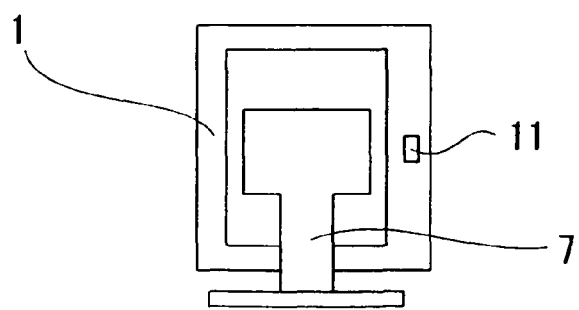
FIG. 11G is a back view illustrating a fifth embodiment of the display device of the present invention.

An operation in the above example configuration will be described. In left views of FIGS. 11E and 11F, a time at which the stand 7 approaches from the direction of a black arrow h is considered. At this time, it becomes right states of FIGS. 11E and 11F since the stand 7 physically presses the rotation determination switch 11 from the direction of the black arrow h. When the stand 7 comes to a back surface of the rotation determination switch 11, it becomes a state where the rotation determination switch 11 is always pressed. That is, when it is not rotated, the rotation determination switch 11 is pressed and the ON state is maintained. When it is rotated, the stand 7 and the rotation determination switch 11 are separated from each other as shown in FIG. 11G Accordingly, since the rotation determination switch 11 is not pressed, it becomes possible to maintain the OFF state.

Making an explanation by FIG. 12, a rotation determination switch signal g which is a signal indicating that the rotation determination switch 11 is ON or OFF is transmitted to the operation signal converting unit 110 by the rotation determination switch 11, an OSD menu operation or a key guide display is processed in a state of being rotated or not rotated, a rotation determination is automatically performed in step S2 of the flow chart of FIG. 6A, and conversion processing of a key operation is performed by the conversion processing table shown in FIGS. 6B and 6C.

Thus, according to the fifth embodiment of the present invention, since it becomes possible to automatically determine whether or not the display device 1 is rotating, it becomes possible to change an OSD section or an OSD switch automatically.

Moreover, although the example shown in FIG. 11 is a method of detecting the rotation state of the stand 7 and the display device 1 by the ON/OFF state of the rotation determination switch 11, a method in which contact terminals are provided on both back surfaces of the stand 7 and the display device 1 may be used and it is detected whether or not the contact terminals come in contact with each other. In addition, the rotation state of the stand 7 and the display device 1 may be detected by other sensors, such as a magnetic sensor or an infrared sensor.

In addition, the example shown in FIG. 11 is effective when the stand is attached. However, when the stand is not attached, the switch maintains the OFF state such that it is erroneously recognized as a rotated state all the time. Instead of this, for example, if an inclination sensor, a gravity sensor, or the like is provided so that it can be detected whether or not a display device itself is inclined, it becomes possible to detect whether or not the display device 1 is rotated without problem whether the stand 7 is used or not.

As described above, according to the present invention, even when a front bezel (frame) is narrow and there is no space where switches are arrayed vertically and horizontally on one side of the front bezel, switches corresponding to the upper, lower, left, and right directions can be disposed visually comfortably by disposing the switches on two sides. Accordingly, it becomes possible to improve the operability. Furthermore, by exchanging a switch operation in the upper and lower directions with a switch operation in the left and right directions also when the display device has been rotated, the on-screen menu can be operated by using switches, which are arrayed up and down, for up and down operations and switches, which are arrayed left and right, for left and right operations. In addition, in the example of the embodiment of the present invention, an example in which the OSD switches are disposed on the lower right side in a state of being not rotated is shown, the same is true for cases where they are disposed on the upper right side, the upper left side, and the lower left side.

In addition, since the front bezel is made narrow, it becomes difficult spatially to write marks, such as marking or silk, or characters on the front bezel. In this case, however, even if there are neither markings nor silk, a switch section (key function) can be expressed for the user by displaying a key guide on the display screen.

Moreover, since the change of section assignment can be expressed by rotating the display device when the key guide is displayed and by changing the contents of the key guide display also when a section assigned to each key (switch) is changed, the user can easily operate a key.

Furthermore, by automatically determining whether or not the display device is rotated, it becomes possible to perform a menu operation without manually performing switching of the OSD section or the section of the OSD switch.

Furthermore, in the example of the embodiment of the present invention, an example in which the display device 1 is made to rotate 90° to the right when rotating it is shown. However, it is not necessary to explain that the same idea as described above can also be applied when the display device 1 is made to rotate 180° to the right and 270° to the right.

While the embodiments of the present invention have been described, it is not necessary to say that the display device of the present invention is not limited to the above-described illustrated examples, but various changes can be made within the scope without departing from the subject matter of the present invention.

INDUSTRIAL APPLICABILITY

Since the present invention has effects in that OSD switches can be disposed without increasing the thickness even if a front bezel is narrow, so that a switch operation can be visually performed without an uncomfortable feeling, the present invention is useful for a display device, an arrangement method of OSD switches, and the like.

The invention claimed is:

1. A display device comprising:
a display screen;
a front bezel surrounding the display screen, the front bezel including first and second sides, the first side being a bottom side and including an end, the second side being different from the bottom side and including an end adjacent to the end of the first side;
an On Screen Display (OSD) section;
a plurality of OSD switches performing various kinds of setting operations using the On Screen Display section, the OSD switches including a first pair of OSD switches for directions of left and right, a second pair of OSD switches for directions of upper and lower, an exit switch corresponding to an exit operation, and a reset switch corresponding to a reset operation, the first pair of OSD switches and the exit switch being disposed on the end of the first side, the second pair of OSD switches and the reset switch being disposed on the end of the second side; and
a control section exchanging operation functions of the OSD switches; and
a determination section configured to detect a rotational state of the display device,
wherein the display device is configured to be rotatable in left and right directions within a plane parallel to the display screen by a rotation mechanism and to indicate a key guide of the OSD switches on the display screen,
wherein when the determination section detects that the display device is rotated 90 degrees, the control section changes operation functions of the first pair of OSD switches to operation functions of the second pair of OSD switches while the control section changes the operation functions of the second pair of OSD switches to the operation functions of the first pair of OSD switches,
and the display device exchanges an indication content of the key guide of the OSD switches so that the indication content corresponds to the operation functions of the OSD switches.

2. The display device according to claim 1, further comprising:
a section displaying a key guide of the OSD switches on the display screen.

3. The display device according to claim 2, further comprising:

a section changing contents of display of the key guide corresponding to operation functions of the OSD switches change according to the type and set value of an OSD setting operation.

4. The display device according to claim 2, wherein when the display device is rotated by the rotation mechanism, the section changes contents of display of the key guide corresponding to operation functions of the OSD switches.

5. The display device according to claim 1, wherein the determination section determines the rotation state of the display device by the rotation mechanism.

6. The display device according to claim 1, wherein the operation functions of the OSD switches change to visually correspond to the rotation state of the display device, and
wherein the indication content of the key guide, displayed along each of the two sides of the display screen corresponding to the plurality of OSD switches on the front bezel, is changed according to the change of the operation functions of the plurality of OSD switches.

7. The display device according to claim 1, wherein the display device is configured to change a color of a key guide of one of the OSD switches in a case where the one of the OSD switches cannot be operated.

8. The display device according to claim 1, wherein when the determination section detects that the display device is rotated 90 degrees, the control section changes an operation function of the reset switch to an operation function of the exit switch while the control section changes the operation function of the exit switch to the operation function of the reset switch.

9. An arrangement method of on screen display (OSD) switches in a display device, the display device comprising:
a display screen;
a front bezel surrounding the display screen, the front bezel including first and second sides, the first side being a bottom side and having an end, the second side being different from the bottom side and having an end adjacent to the end of the first side;
an OSD section;
a plurality of OSD switches performing various kinds of setting operations using the OSD section,
the OSD switches including a first pair of OSD switches for directions of left and right, a second pair of OSD switches for directions of upper and lower, an exit switch corresponding to an exit operation, and a reset switch corresponding to a reset operation;
a control section exchanging operation functions of the OSD switches; and
a determination section configured to detect a rotational state of the display device,
the arrangement method comprising:
disposing the first pair of the OSD switches and the exit switch on the end of the first side;
disposing the second pair of the OSD switches and the reset switch on the end of the second side; and
exchanging operation functions of the OSD switches,
wherein the display device is configured to be rotatable in left and right directions within a plane parallel to the display screen by a rotation mechanism and to indicate a key guide of the OSD switches on the display screen,
wherein when the determination section detects that the display device is rotated 90 degrees, the control section changes operation functions of the first pair of OSD switches to operation functions of the second pair of OSD switches while the control section changes the operation functions of the second pair of OSD switches to the operation functions of the first pair of OSD switches
and the display device exchanges an indication content of the key guide of the OSD switches so that the indication content corresponds to the operation functions of the OSD switches.

10. The arrangement method according to claim 9, wherein the plurality of OSD switches are disposed on a front bezel surrounding the display device,
wherein the operation functions of the OSD switches change to visually correspond to the rotation state of the display device, and
wherein the indication content of the key guide, displayed along each of the two sides of the display screen corresponding to the plurality of OSD switches on the front bezel, is changed according to the change of the operation functions of the plurality of OSD switches.

11. The arrangement method according to claim 9, wherein the display device is configured to change a color of a key guide of one of the OSD switches in a case where the one of the OSD switches cannot be operated.

12. The arrangement method according to claim 9, wherein when the determination section detects that the display device is rotated 90 degrees, the control section changes an operation function of the reset switch to an operation function of the exit switch while the control section changes the operation function of the exit switch to the operation function of the reset switch.

* * * * *